No. 635,548.　　　　　　　　　　　　　　　Patented Oct. 24, 1899.
J. C. HYMAN.
SEAT POST FASTENING.
(Application filed Sept. 26, 1898.)

(No Model.)

Witnesses:
Geo. W. Young.
Chas. L. Goss.

Inventor:
Joseph C. Hyman
By Wmter Hindus Smith Cotton Vrles
Attorneys.

UNITED STATES PATENT OFFICE.

JOSEPH C. HYMAN, OF MILWAUKEE, WISCONSIN.

SEAT-POST FASTENING.

SPECIFICATION forming part of Letters Patent No. 635,548, dated October 24, 1899.

Application filed September 26, 1898. Serial No. 691,901. (No model.)

*To all whom it may concern:*

Be it known that I, JOSEPH C. HYMAN, a citizen of the United States, residing at Milwaukee, in the county of Milwaukee and State of Wisconsin, have invented certain new and useful Improvements in Seat-Post Fastenings, of which the following is a specification, reference being had to the accompanying drawings, forming a part thereof.

My invention relates to seat-post fastenings for bicycles or similar vehicles. Its main objects are to facilitate the adjustment of the seat, to hold the same firmly in place when adjusted, and to permit free movement of the seat-post when the fastening is disengaged.

It consists of certain novel features of construction and combinations of parts, hereinafter particularly described, and pointed out in the claims.

In the accompanying drawings like letters designate the same parts in the several figures.

Figure 1:
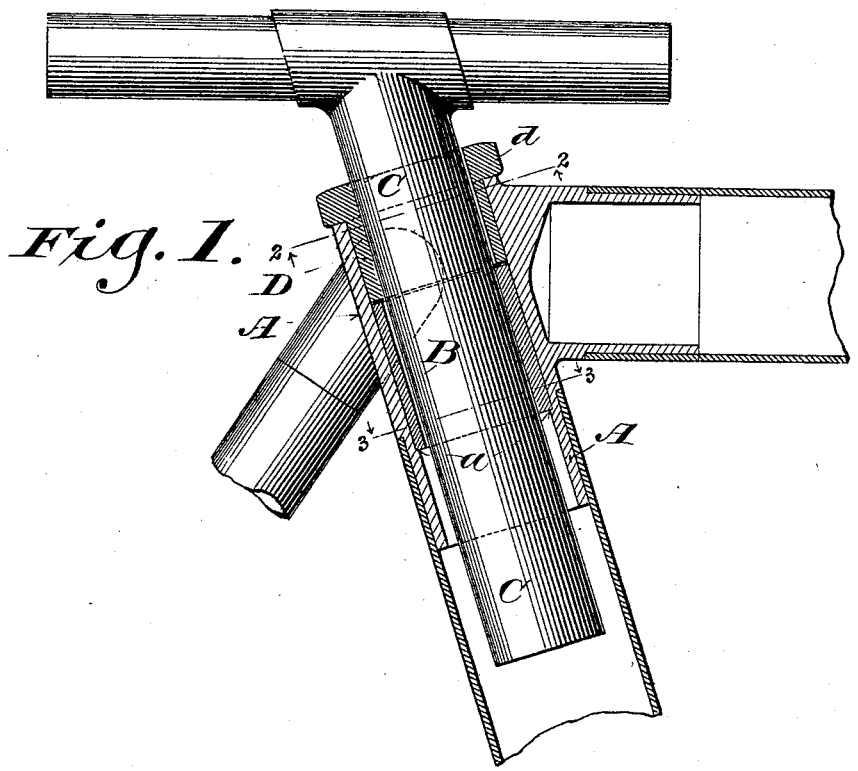
Figure 2:
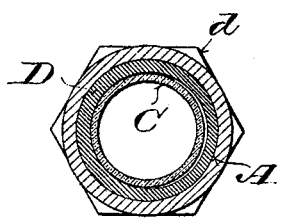
Figure 3:
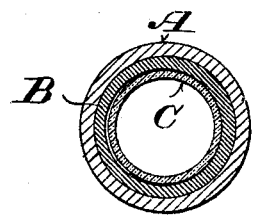

Figure 1 is a vertical medial section of a bicycle-seat-post fastening embodying my invention; and Figs. 2 and 3 are cross-sections of the same on the lines 2 2 and 3 3, respectively, Fig. 1.

A designates a tubular frame-fitting which forms the upper end of the mast or upright and a connection between it and adjoining members of a bicycle-frame.

B is a sleeve fitted and driven tightly into the fitting A against an inwardly-projecting shoulder *a* in said fitting. It has an eccentric bore in which the seat-post C is loosely fitted and for which it serves as a bearing and one member of the fastening. In the construction shown in the drawings this sleeve or bearing is made separate from the fitting A; but it may be formed integrally therewith.

D is a collar fitted to turn in the upper end of the tubular fitting A and formed with an eccentric bore corresponding in size and eccentricity with that of the sleeve or bearing.

The collar D is formed or provided at its upper exposed end with means for turning it. In the construction shown it is formed with a squared flange or wrench-head *d*, which projects over and bears upon the upper end of the fitting A. When the collar D is turned so as to bring the hole therein into line with the hole in the sleeve B, the seat-post C will slip freely up and down therein; but when the collar D is turned, as shown in Fig. 1, so as to throw the hole therein out of line with the hole in the sleeve B the seat-post C will be tightly gripped or clamped by the thicker inwardly-projecting portions of said collar and sleeve, as shown in the drawings. In the arrangement of parts shown in the drawings the thicker portion of the sleeve B is placed on the front side of the mast or fitting A and the thicker portion of the collar D is turned rearwardly to grip the seat-post; but this arrangement, while it is, perhaps, preferable, is not essential to the effective operation of the fastening.

By means of a fastening constructed substantially as herein shown and described the seat is quickly and easily adjusted and when adjusted is firmly and securely held in place. A partial turn of the collar D suffices to engage or release the seat-post, and when it is turned in one direction it as completely releases the seat-post as when turned in the opposite direction it binds it in place.

Various changes may be made in the details of construction without affecting the principle of the fastening or departing from the intended scope of the invention, and the fastening may be adapted to and used with frames or frame-fittings of various constructions.

I claim—

1. A seat-post fastening consisting of a frame tube or fitting having two bores, one eccentric to and smaller than the other and constituting a bearing for the seat-post and one member of the fastening, and an eccentric collar fitted to turn in the larger bore of said frame tube or fitting and constituting the other member of the fastening, substantially as and for the purposes set forth.

2. A seat-post fastening consisting of an eccentric stationary sleeve or bearing in an upright tubular frame member, and an eccentric collar fitted to turn in said frame member, substantially as and for the purposes set forth.

3. A seat-post fastening consisting of an eccentric sleeve or bearing fixed in and below the upper end of a frame tube or fitting, and an eccentric collar loosely fitted in said tube or fitting above said sleeve or bearing and formed with a squared flange which is adapted to project over the upper end of said frame, tube or fitting, substantially as and for the purposes set forth.

In witness whereof I hereto affix my signature in presence of two witnesses.

JOSEPH C. HYMAN.

Witnesses:
CHAS. L. GOSS,
WM. S. BATES.